2,953,519
Patented Sept. 20, 1960

2,953,519
START UP PROCEDURE FOR CATALYTIC HYDROGEN TREATMENT OF HYDROCARBONS

Paul G. Bercik, Donora, and Alfred M. Henke, Springdale, Pa., assignors to Gulf Research & Development Company, Pittsburgh, Pa., a corporation of Delaware No Drawing. Filed Dec. 16, 1957, Ser. No. 702,775

5 Claims. (Cl. 208—143)

This invention relates to improved procedure for hydrogen treatment of hydrocarbons and in particular to improved start-up procedure for such hydrogen treatment.

It is well known that hydrogen treatment of hydrocarbons can be catalyzed with metal sufides and especially with a sulfide of a metal of group VI lefthand column of the periodic system mixed or composited with a sulfide of an iron group metal. These catalysts are known to be highly active for hydrogen treatment reactions. This is especially true of tungsten sulfide-nickel sulfide mixtures. For instance it is known to hydroreform and/or hydrodesulfurize hydrocarbons utilizing metal sulfide catalysts. Also it is known to hydrogenate aromatic components of petroleum fractions in the presence of these catalysts. Destructive hydrogenation is also carried out in the presence of these catalysts. Furthermore it has been known to hydrogenate lubricating oil stocks utilizing such catalysts. Examples of hydrogenation of these and other materials with sulfide catalysts will be found in U.S. Patents 2,554,282, 2,038,599, 2,406,200, 2,435,380 and 2,744,052, British Patent 768,839 and "Oil and Gas Journal," July 18, 1955, pages 92–94. The conventional start-up procedure when utilizing these catalysts is to prereduce the catalyst in a stream of hydrogen at about 800°–850° F. for a period of about four hours. We have discovered that this procedure has a harmful effect on the catalyst.

This invention has for its object to provide improved procedure for hydrogen treatment of hydrocarbons in the presence of a metal sulfide hydrogenation catalyst. Another object is to provide improved start-up procedure for hydrogen treatment of hydrocarbons in the presence of a mixed sulfide catalyst comprising essentially a sulfide of a metal of group VI left-hand column mixed or composited with an iron group metal sulfide. Other objects will appear hereinafter.

These and other objects are accomplished by our invention which comprises an improved start-up procedure involving introducing hydrogen into the hydrogenation reactor which contains a hydrogenation catalyst comprising a metal sulfide, increasing the temperature of the catalyst to reaction temperature, introducing the liquid hydrocarbon charge stock to be hydrogen treated into the reactor before the reactor is heated above 275° to 300° F. in amounts sufficient to completely wet the catalyst with the liquid hydrocarbon, continuing introduction of the hydrogen while maintaining the catalyst in wetted condition until reaction temperature is reached and thereafter introducing hydrogen and hydrocarbon charge stock at reaction temperature and pressure.

In carrying out hydrogen treatment of hydrocarbons in the presence of the above described catalysts, commercial practice involves a continuous operation in which hydrogen and the hydrocarbon charge stock are contacted with the catalyst at the reaction temperature. The effluent from the reactor is treated to separate hydrogen which is recycled (after purification if necessary) and the products are separated from the effluent. In accordance with our invention the start-up operation is accomplished by first introducing the hydrogen for the hydrogen treatment into the reactor containing the catalyst which is at about atmospheric or a somewhat elevated temperature. The hydrogen is preferably introduced at about the pressure which is to be used in the on-stream reaction. The reactor is then heated to reaction temperature. It is preferred that this heating be gradual so that no part of the catalyst will be accidentally heated to a temperature in excess of about 275°–300° F. Prior to reaching this temperature, i.e. preferably at about a temperature of 225° to 275° F. charge stock is introduced into the reactor in order to thoroughly wet the catalyst surface. The catalyst may be either immersed or alternatively the surface and pores coated with a film of the liquid. Heating of the catalyst is continued until the catalyst is heated up to reaction temperature. During such heating the liquid hydrocarbon charge stock is maintained in the reactor in amounts sufficient to keep the surface of the catalyst wetted. Therefore if the hydrocarbon is removed by the hydrogen, additional hydrocarbon should be added either intermittently or continuously. The feed stock is preferably introduced initially at a high space velocity of about 1 to 10 volumes of charge per volume of catalyst per hour and then may be reduced, after the catalyst bed is wetted, to a rate sufficient to keep the catalyst wetted. When reaction conditions are reached, the hydrogen and hydrocarbon charge stock are introduced at the desired reaction rates.

It is preferable that the hydrogen and the hydrocarbon charge stock be introduced, during the start-up procedure, at approximately the same rates as will be used during the on-stream period at reaction temperature. However, it is feasible to utilize smaller or larger volumes of hydrogen and charge stock. The important condition is to maintain the catalyst surface in wetted condition while in the presence of hydrogen at a temperature of above about 275° F.–300° F. Also the rate of flow of hydrogen at all times should be sufficient to prevent formation of oxidation compounds from the sulfides and substantial deposition of carbon as a result of thermal decomposition of the hydrocarbon charge stock. Between about 50 and 2000 volumes of hydrogen per hour (measured under standard conditions of pressure and temperature) per volume of catalyst should be passed through the reactor before and after the 275°–300° F. temperature is reached and a catalyst to hydrocarbon charge stock volume hourly ratio of 0.2 to 10 is generally satisfactory for these purposes.

Our invention is applicable to sulfides of metals which have a hydrogenating action such as zinc sulfide, manganese sulfide, copper sulfide, the sulfides of group VI left-hand column metals and the sulfides of the iron group metals alone or mixed or composited with each other, e.g. tungsten, molybdenum or nickel sulfide, cobalt-tungsten sulfides, cobalt-molybdenum sulfides, nickel-molybdenum sulfides and iron-tungsten sulfides. It is especially applicable to a mixture of nickel and tungsten sulfides. The catalyst may be supported or unsupported and may be used in a fluidized or fixed bed. It is preferable to avoid contact of the catalyst with oxygen and/or water or water vapor. Therefore it is desirable to remove these materials from the charge stock.

While our invention is of general utility in connection with the hydrogen treatment of liquid hydrocarbons such as for instance the destructive hydrogenation of residual containing petroleum and fractions thereof, the hydrogenation of diolefins in light hydrocarbon mixtures, the hydrodesulfurization of naphthas, the hydrogenation and hydrodesulfurization of furnace oils, the reforming of naphthas, etc., it is of particular value in connection with the hydrogenation of lubricating oil stocks in order to prepare improved lubricating oils. These hydrogen treatments are well know in the art and are generally carried out at a temperature of between about 500° and 900° F., at a pressure between about 250 and 10,000 p.s.i. Space velocities of between about 0.1 and 10 (volumes of charge per volume of catalyst per hour) are generally employed in these reactions. In connection with lubricating oils, the temperature, space velocity and pressure will depend to a large extent on whether a high V.I. oil is desired or whether moderate improvement in V.I. characteristics of the oil is desired. When high V.I. is required in the product, temperatures of between about 685° and 825° F. and space velocities between about 0.25 and 2.0 will be employed. Also for high V.I. lube oils pressures should be in excess of about 2500 p.s.i. and may be as high as 10,000 p.s.i. or higher. Pressures of 3000 to 4000 would be preferable for this purpose. Where moderate improvement in the lube oil such as moderate V.I. improvement and/or color improvement is desired, a pressure of between about 500 and 2500 p.s.i., a temperature of 450° to 700° F. and a space velocity between about 0.2 and 8 will usually be employed. Hydrogen is generally employed in amounts of between about 500 and 10,000 s.c.f./bbl. of hydrocarbon charge stock in all of these hydrogen treatment procedures.

*Example I*

In order to illustrate the harmful effects of prereduction with hydrogen on catalysts of this type and in order to show the beneficial effects of the start-up procedure constituting our invention, a series of hydrogenations were carried out on undewaxed lubricating oil fractions of an Ordovician crude (67 percent unpressable distillate and 33 percent deasphalted residuum). The reaction conditions in these tests were the temperatures indicated in Tables I and II, a pressure of 3000 p.s.i.g., a 0.5 liquid hourly space velocity, and 5000 s.c.f. $H_2$/bbl. The catalyst in all of these tests was a mixture of nickel and tungsten sulfides in a ratio of 1.5:1. The initial catalyst was identical in all of the tests. To determine the effect of prereduction, the catalyst was heated in a 425 S.T.P. space velocity stream of pure hydrogen for four hours at temperatures of 775°, 850°, 900° and 950° F. Thereafter the charge stock and hydrogen were passed over the catalyst under the conditions specified above. In the case of the tests utilizing our improved start-up procedure the catalyst was placed in the reactor, hydrogen flow was started at the rate used during the on-stream reaction and at a temperature of about 80° F. The temperature was increased in one hour to about 225° F. Thereafter the charge stock was introduced into the reactor at 2 liquid hourly space velocity for about one hour. The temperature was thereafter increased to the reaction temperature in 4 hours while maintaining the hydrogen and oil flow rates. Thereafter the reaction was continued under the conditions specified above, the only change being to decrease the space velocity of the charge stock from 2 to the 0.5 space velocity.

In order to compare the activities of these catalysts for hydrocracking and saturative hydrogenation activity, the increase in V.I. (viscosity index) was taken as a measurement of the hydrocracking activity. The iodine number was taken as a measurement of the saturative hydrogenation activity. The V.I. and iodine number of the product obtained by utilizing a catalyst prereduced at 775° F. and thereafter used at a processing temperature of 715° F. was assigned an arbitrary value of 100. By comparing the V.I. and iodine numbers of the products obtained in the other runs it was possible to determine the relative activities of each catalyst. The results from these tests are given in Tables I and II.

*Table I*

HYDROCRACKING ACTIVITY INDEX

| Prereducing Temp., ° F. | Temperature of Processing | | |
|---|---|---|---|
| | 650° F. | 715° F. | 730° F. |
| none | 100 | 135 | 150 |
| 775 | 31 | 100 | 119 |
| 850 | 31 | 100 | 119 |
| 900 | 23 | 65 | 81 |
| 950 | 8 | 39 | 50 |

*Table II*

SATURATIVE HYDROGENATION ACTIVITY INDEX

| Prereducing Temp., ° F. | Temperature of Processing | | |
|---|---|---|---|
| | 650° F. | 715° F. | 730° F. |
| none | 106 | 106 | 106 |
| 775 | 95 | 100 | 102 |
| 850 | 95 | 100 | 102 |
| 900 | 65 | 96 | 103 |
| 950 | 59 | 94 | 102 |

From the data given in Tables I and II, it will be evident that the start-up procedure described herein results in a catalyst having a much higher hydrocracking and saturative hydrogenation activity than a catalyst prereduced in hydrogen at 775°, 850°, 900° or 950° F.

We claim:

1. In the starting up of a process comprising hydrogen treatment of a liquid hydrocarbon at a temperature between about 450° and 900° F., at a pressure between about 250 and 10,000 p.s.i. in the presence of a metal sulfide hydrogenation catalyst and in which process hydrogen and liquid hydrocarbon charge stock are continuously introduced into a reactor containing said catalyst, the improvement which comprises causing hydrogen to flow through the reactor containing said sulfide catalyst, increasing the temperature of the catalyst to reaction temperature, introducing liquid hydrocarbon stock into the reactor before the reactor is heated above about 275° to 300° F. in amounts sufficient to completely wet the catalyst with the liquid hydrocarbon, continuing introduction of the hydrogen while maintaining the catalyst in wetted condition until reaction temperature is reached and thereafter introducing hydrogen and hydrocarbon charge stock at reaction temperature and pressure.

2. In the starting up of a process comprising hydrogen treatment of a liquid hydrocarbon at a temperature between about 450° and 900° F., at a pressure between about 250 and 10,000 p.s.i. in the presence of a catalyst comprising essentially a sulfide of a metal of group VI, left-hand column of the periodic system composited with a sulfide of a metal of the iron group and in which process hydrogen and liquid hydrocarbon charge stock are continuously introduced into a reactor containing said sulfide catalyst, the improvement which comprises causing hydrogen to flow through the reactor containing said catalyst, increasing the temperature of the catalyst during said hydrogen flow, introducing liquid hydrocarbon charge stock into the reactor before the reactor is heated above about 275° to 300° F. in amounts sufficient to completely wet the catalyst with the liquid hydrocarbon, continuing introduction of the hydrogen while maintaining the catalyst in wetted condition until reaction temperature is reached and thereafter introducing hydrogen and hydrocarbon charge stock at reaction temperature and pressure.

3. In the starting up of a process comprising hydrogen treatment of a liquid hydrocarbon at a temperature between about 450° and 900° F., at a pressure between about 250 and 10,000 p.s.i. in the presence of a metal sulfide hydrogenation catalyst and in which process hydrogen and liquid hydrocarbon charge stock are continuously introduced into a reactor containing said catalyst, the improvement which comprises causing hydrogen to flow through the reactor containing said sulfide catalyst, increasing the temperature of the catalyst during said hydrogen flow, introducing liquid hydrocarbon charge stock into the reactor when the reactor is heated to between about 225° and 275° F. in amounts sufficient to completely wet the catalyst with the liquid hydrocarbon, continuing introduction of the hydrogen while maintaining the catalyst in wetted condition until reaction temperature is reached and thereafter introducing hydrogen and hydrocarbon charge stock at reaction temperature and pressure.

4. In the starting up of a process comprising hydrogen treatment of a lubricating oil stock at a temperature between about 450° and 825° F., at a pressure between about 400 and 4000 p.s.i. in the presence of a catalyst comprising essentially a sulfide of a metal of group VI, left-hand column of the periodic system composited with a sulfide of a metal of the iron group and in which process hydrogen and lube oil charge stock are continuously introduced into a reactor containing said sulfide catalyst, the improvement which comprises causing hydrogen to flow through the reactor containing said catalyst, increasing the temperature of the catalyst during said hydrogen flow, introducing lube oil charge stock into the reactor before the reactor is heated above about 275° to 300° F. in amounts sufficient to completely wet the catalyst with the lube oil charge stock, continuing introduction of the hydrogen while maintaining the catalyst in wetted condition until reaction temperature is reached and thereafter introducing hydrogen and lube oil charge stock at reaction temperature and pressure.

5. In the starting up of a process comprising hydrogen treatment of a lubricating oil stock at a temperature between about 685° and 825° F., at a pressure between about 2500 and 4000 p.s.i. in the presence of a catalyst comprising essentially a sulfide of a metal of group VI, left-hand column of the periodic system composited with a sulfide of a metal of the iron group and in which process hydrogen and lube oil charge stock are continuously introduced into a reactor containing said catalyst, the improvement which comprises causing hydrogen to flow through the reactor containing said sulfide catalyst at about atmospheric temperature, increasing the temperature of the catalyst during said hydrogen flow, introducing lube oil charge stock into the reactor before the reactor is heated above about 275° to 300° F. in amounts sufficient to completely wet the catalyst with the lube oil charge stock, continuing introduction of the hydrogen while maintaining the catalyst in wetted condition until reaction temperature is reached and thereafter introducing hydrogen and lube oil charge stock at reaction temperature and pressure.

References Cited in the file of this patent

UNITED STATES PATENTS

| | | |
|---|---|---|
| 2,174,510 | Gwynn | Oct. 3, 1939 |
| 2,744,052 | Nozaki | May 1, 1956 |
| 2,761,817 | Sweetser et al. | Sept. 4, 1956 |
| 2,866,750 | Mosesman | Dec. 30, 1958 |